United States Patent [19]
Suzuki et al.

[11] Patent Number: 5,598,484
[45] Date of Patent: Jan. 28, 1997

[54] APPARATUS FOR ENCODING AN IMAGE SIGNAL

[75] Inventors: Kazuhiro Suzuki; Koh Kamizawa; Yutaka Koshi; Setsu Kunitake, all of Kanagawa, Japan

[73] Assignee: Fuji Xerox Co., Ltd., Tokyo, Japan

[21] Appl. No.: 385,204

[22] Filed: Feb. 8, 1995

Related U.S. Application Data

[63] Continuation of Ser. No. 936,346, Aug. 28, 1992, abandoned.

[30] Foreign Application Priority Data

Aug. 30, 1991 [JP] Japan ................... 3-220593
Aug. 30, 1991 [JP] Japan ................... 3-220596

[51] Int. Cl.$^6$ ................... G06K 9/36; G06K 9/46
[52] U.S. Cl. ................... 382/239; 382/207; 382/248; 358/261.2; 358/430; 358/432
[58] Field of Search ................... 382/207, 236, 382/248, 239; 358/261.1, 261.2, 261.3, 430, 432, 433, 426

[56] References Cited

U.S. PATENT DOCUMENTS

| | | | |
|---|---|---|---|
| 4,792,851 | 12/1988 | Mochizuki | 358/136 |
| 5,051,840 | 9/1991 | Watanabe et al. | 358/433 |
| 5,065,446 | 11/1991 | Suzuki et al. | 382/56 |
| 5,121,216 | 6/1992 | Chen et al. | 358/261.3 |
| 5,162,923 | 11/1992 | Yoshida et al. | 358/433 |
| 5,170,264 | 12/1992 | Saito et al. | 358/426 |

FOREIGN PATENT DOCUMENTS 0500306 8/1992 European Pat. Off. ....... H04N 7/133

OTHER PUBLICATIONS

Image Coding Algorithms II–Transform Coding, H. Hashimoto, Journal of the Institute of Television Engineers of Japan, 43 (10):1145–1152 (1989).

An Adaptive Orthogonal Transform Coding Algorithm for Images Utilizing Classification Technique, Y. Kato et al., Transactions of the Institute of Electronics, Information and Communication Engineers(B), J71–B (1):1–9, (1988).

Digital Image Processing, Pratt, Wiley–Interscience Publication, New York, pp.678–699 (1978).

Adaptive Coding of Monochrome and Color Images, Chen et al., IEEE Transactions on Communications, COM–25 (11):1285–1292 (1977).

Scene Adaptive Coder, Chen et al., IEEE Transactions on Communications, COM–32 (3):225–232 (1984).

Primary Examiner—Jose L. Couso
Assistant Examiner—Matthew C. Bella
Attorney, Agent, or Firm—Finnegan, Henderson, Farabow, Garrett & Dunner, L.L.P.

[57] ABSTRACT

Apparatus for encoding an image signal which is capable of improving the quality of a reproduced image with respect to not only a general image in which electric power is concentrated in low-frequency region coefficients but also an image where the electric power is concentrated in a high-frequency region. The apparatus comprises a blocking device in which a rectangular area in an image is detected from a digital image signal as a pixel block, and is subjected to an orthogonal transform by a converter to obtain a transformed coefficient. In addition, an activity calculator calculates the variance of the image within the block, and electric power to be preserved during encoding is determined by a power-preservation-rate determining device on the basis of the variance determined. An optimum mask is selected by a mask selector on the basis of a transformed coefficient from the converter and a power preservation rate from the power-preservation-rate determining device, and the selection of the transformed coefficient is performed by a coefficient selector by means of this mask. The transformed coefficient after being selected is quantized by a quantizer, is encoded to be outputted through a transmission line.

3 Claims, 12 Drawing Sheets

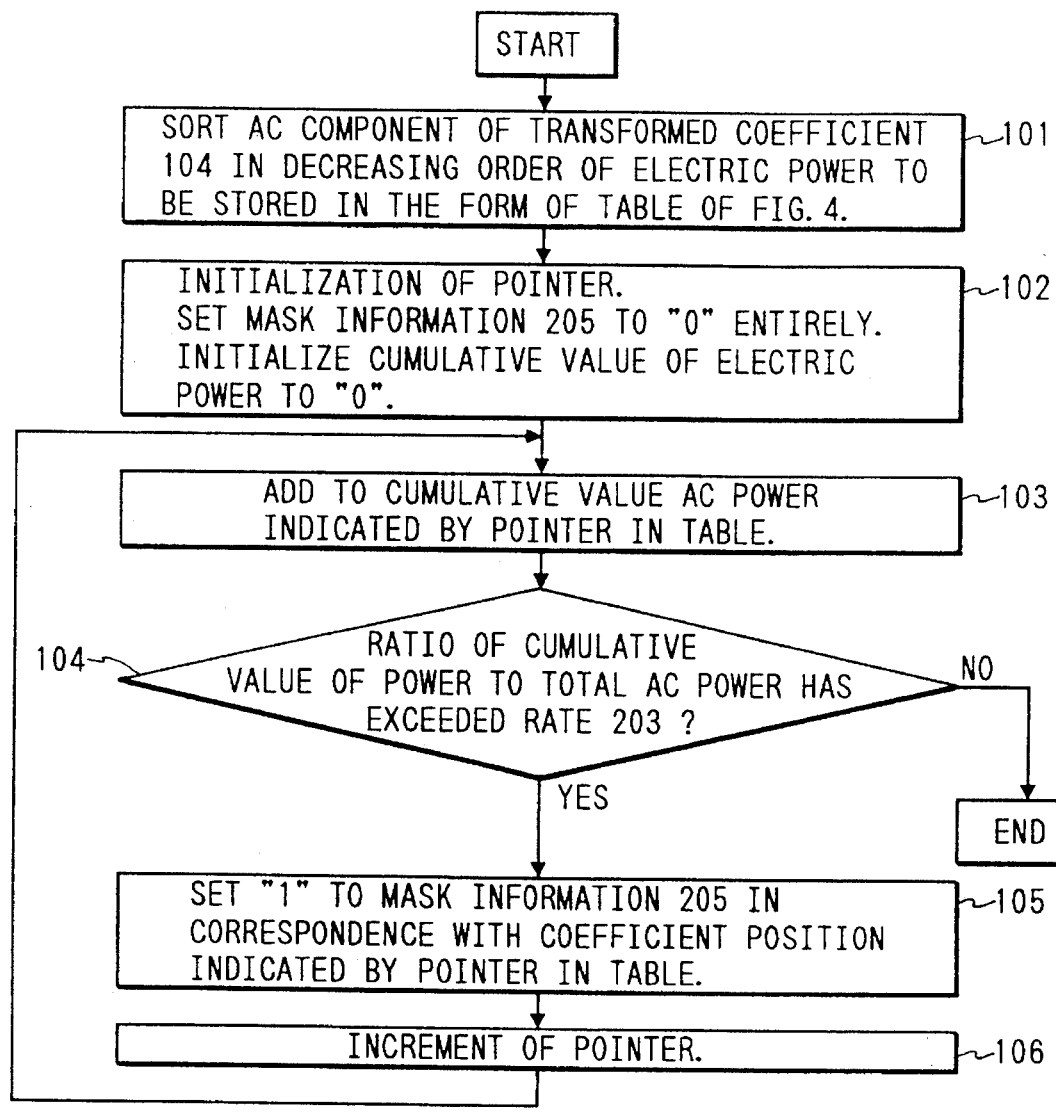

FIG. 12(a)
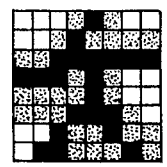
INTRICATE
PATTERN
FIG. 12(b)
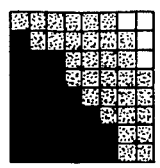
PLAT
PATTERN
LARGE ←——— ACTIVITY ———→ SMALL
FIG. 13
| WAVEFORM INFORMATION \ INDEX | 0 | 1 | 2 |
|---|---|---|---|
| 0 | 1 1 1 0 0 0 0 0<br>1 1 1 0 0 0 0 0<br>1 1 0 0 0 0 0 0<br>1 1 0 0 0 0 0 0<br>1 1 0 0 0 0 0 0<br>1 0 0 0 0 0 0 0<br>1 0 0 0 0 0 0 0<br>0 0 0 0 0 0 0 0 | 1 1 1 0 0 0 0 0<br>1 1 1 0 0 0 0 0<br>1 1 1 0 0 0 0 0<br>1 1 1 0 0 0 0 0<br>1 1 0 0 0 0 0 0<br>1 1 0 0 0 0 0 0<br>1 1 0 0 0 0 0 0<br>1 1 0 0 0 0 0 0 | 1 1 1 1 0 0 0 0<br>1 1 1 1 0 0 0 0<br>1 1 1 1 0 0 0 0<br>1 1 1 1 0 0 0 0<br>1 1 1 0 0 0 0 0<br>1 1 1 0 0 0 0 0<br>1 1 1 0 0 0 0 0<br>1 1 0 0 0 0 0 0 |
| 1 | 1 1 1 1 1 0 0 0<br>1 1 1 1 1 0 0 0<br>1 1 1 1 0 0 0 0<br>1 1 1 1 0 0 0 0<br>1 1 0 0 0 0 0 0<br>1 0 0 0 0 0 0 0<br>0 0 0 0 0 0 0 0<br>0 0 0 0 0 0 0 0 | 1 1 1 1 1 1 1 0<br>1 1 1 1 1 1 1 0<br>1 1 1 1 1 1 0 0<br>1 1 1 1 1 1 0 0<br>1 1 1 1 0 0 0 0<br>1 1 1 1 0 0 0 0<br>1 1 0 0 0 0 0 0<br>0 1 0 0 0 0 0 0 | 1 1 1 1 1 1 1 1<br>1 1 1 1 1 1 1 1<br>1 1 1 1 1 1 1 0<br>1 1 1 1 1 1 1 0<br>1 1 1 1 1 1 0 0<br>1 1 1 1 0 0 0 0<br>1 1 1 0 0 0 0 0<br>1 1 0 0 0 0 0 0 |
| 2 | 1 1 1 1 1 1 0 0<br>1 1 1 1 0 0 0 0<br>1 1 1 0 0 0 0 0<br>1 0 0 0 0 0 0 0<br>0 0 0 0 0 0 0 0<br>0 0 0 0 0 0 0 0<br>0 0 0 0 0 0 0 0<br>0 0 0 0 0 0 0 0 | 1 1 1 1 1 1 1 1<br>1 1 1 1 1 1 1 0<br>1 1 1 1 1 1 0 0<br>1 1 1 1 0 0 0 0<br>1 1 0 0 0 0 0 0<br>0 0 0 0 0 0 0 0<br>0 0 0 0 0 0 0 0<br>0 0 0 0 0 0 0 0 | 1 1 1 1 1 1 1 1<br>1 1 1 1 1 1 1 1<br>1 1 1 1 1 1 1 0<br>1 1 1 1 1 1 0 0<br>1 1 1 1 0 0 0 0<br>0 0 0 0 0 0 0 0<br>0 0 0 0 0 0 0 0<br>0 0 0 0 0 0 0 0 |
| ⋮ | ⋮ | ⋮ | ⋮ |

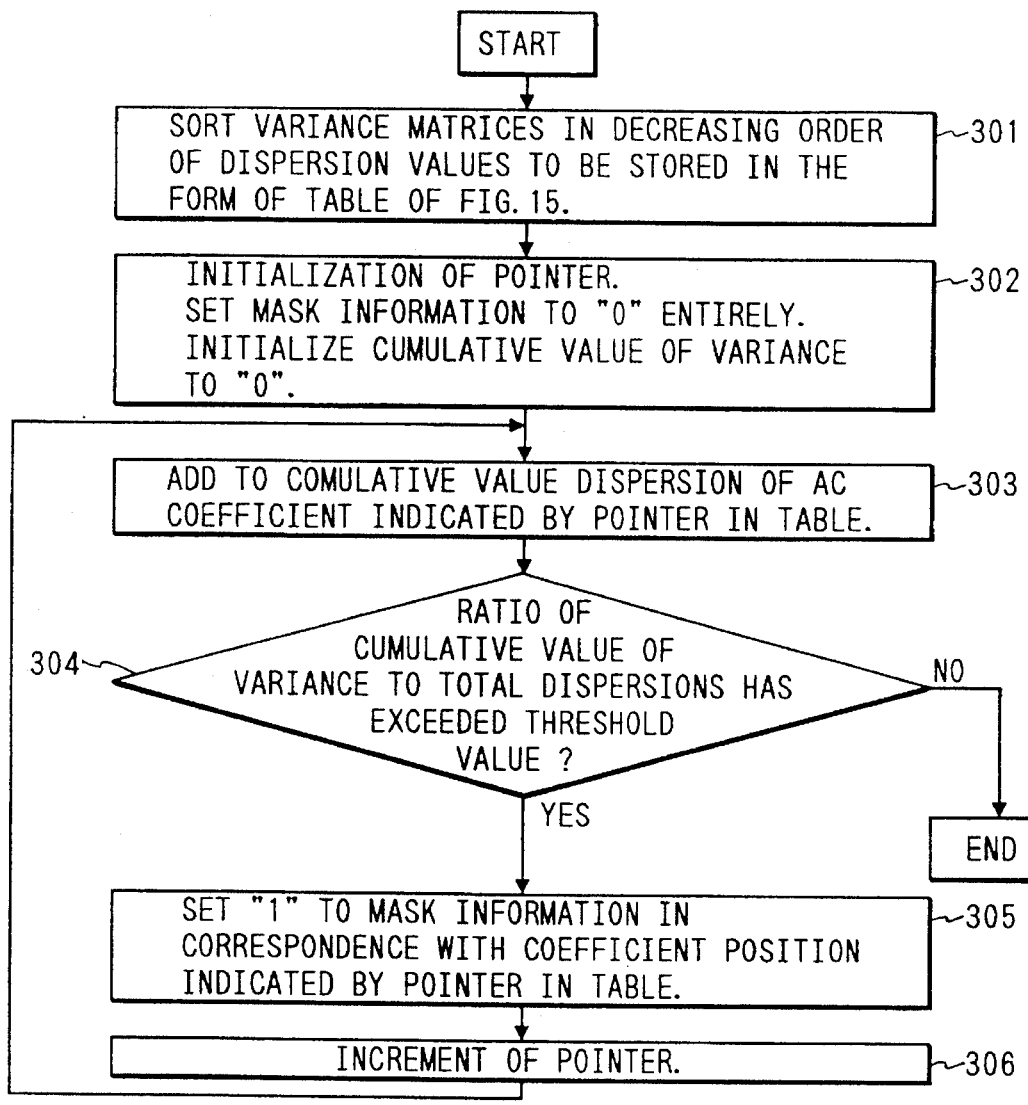

APPARATUS FOR ENCODING AN IMAGE SIGNAL

This application is a continuation of application Ser. No. 07/936,346 filed Aug. 28, 1992, now abandoned.

BACKGROUND OF THE INVENTION

The present invention relates to an apparatus for coding an image signal.

In handling continuous-tone image information, if the image information is digitized as it is, the amount of information becomes very large, so that the amount of information is generally compressed by coding the image information.

Although there are various techniques of coding image information, as a typical technique of coding a continuous-tone image, a transform coding method is known, which is disclosed in, for instance, Hideo Hashimoto: An Introduction to Compression of Image Information "Image Coding Algorithms II—Transform Coding ", The Journal of the Institute of Television Engineers of Japan, Vol. 43, No. 10 (1989), pp. 1145–1152.

Such a transform coding method will be described with reference to FIG. 1 showing a basic block diagram thereof.

Reference numeral 101 denotes a blocking device for detecting a rectangular area in an image as a pixel block 102 from a digital image signal 100; 103, a converter for performing orthogonal transforms with respect to the pixel block 102 and outputting the same as transformed coefficients 104; 105, a coefficient selector for selecting a specific coefficient from the transformed coefficients 104 and outputting a selected transformed coefficient 106; 107, a quantizer or quantizing the selected transformed coefficients 106 and outputting a quantization coefficient 108; and 109, an encoder for encoding the quantization coefficient 108 and outputting encoded data 110 to a transmission line 111.

Next, an operation of the system shown in FIG. 1 will be described. In the system of FIG. 1, coding processing comprises transform processing, information reduction processing, and code assignment processing.

In the transform processing, in the case of an image signal, a two-dimensional orthogonal transform is carried out in which the correlation between horizontal and vertical directions is utilized. The pixel block 102 including M pixels and N pixels n the horizontal and vertical directions, respectively, is formed n the blocking device 101, and a one-dimensional orthogonal transform is carried out independently in the horizontal and vertical directions in the converter 103. In the converter 103, a linear transformation is performed according to the following expression (1):

$$Y = A_N X A_M^T \quad (1)$$

where X is the pixel block 102 having N rows and M columns; Y is the transformed coefficient 104; and $A_N$ and $A_M$ are orthogonal transform matrices n the N-th and M-th orders, respectively.

Although there are various methods using an orthogonal transform a discrete cosine transform (hereafter referred o as the DCT) s generally employed n the light of the coding efficiency. The transformation of the two-dimensional DC is given by an expression (2), end an inverse transform thereof is given by an expression (3).

$$Y(u,v) = \frac{4C(u)C(v)}{N^2} \sum_{j=0}^{N-1} \sum_{k=0}^{N-1} X(j,k) \cdot \cos\left[\frac{(2j+1)u\pi}{2N}\right] \cos\left[\frac{(2k+1)v\pi}{2N}\right] \quad (2)$$

$$X(j,k) = \sum_{u=0}^{N-1} \sum_{v=0}^{N-1} C(u)C(v)Y(u,v) \cdot \cos\left[\frac{(2j+1)u\pi}{2N}\right] \cos\left[\frac{(2k+1)v\pi}{2N}\right] \quad (3)$$

Here, $$C(w) = \begin{cases} \frac{1}{\sqrt{2}} & W = 0 \\ 1 & W = 1,2,3,\ldots,N-1 \end{cases} \quad (4)$$

In addition, X(j, k) represents the elements of the pixel block 102, and j and k represent the positions of the elements. Y(u, v) represents the elements of the transformed coefficient 105, and u and v represent the positions of the elements.

The information reduction processing is performed by the coefficient selector 105 and the quantizer 107. In the coefficient selector 105, a coefficient is selected on the basis of a dispersion of the transformed coefficients 104 so as to obtain the selected transformed coefficient 106.

In such a transform coding method, a technique in which the dispersion of the coefficients is compared with a fixed threshold value to select a coefficient greater than the threshold and the coefficients lower than the threshold value are set to 0 to increase the compression efficiency is proposed in William K. Pratt: "Digital Image Processing", Wiley-Interscience, pp. 678–699. The threshold in this case can be determined from the statistics of the transformed coefficients of a multiplicity of images. In addition, a technique has been proposed in which the threshold is determined from the statistics of transformed coefficients for each image. However, in the case where the distribution of the transformed coefficients differs from these statistics, deterioration in image quality may occur.

In the quantizer 107, the selected transformed coefficients 106 are quantized to obtain the quantization coefficient 108.

As the code assignment processing, in the encoder 109, a code word is assigned to the quantization coefficient 108 so as to form the encoded data 110, which is outputted to the transmission line 111.

Through each processing described above, the image information can be coded by the transform coding method.

With the above-described method, however, since the selection of the coefficients is determined uniformly with respect to all the pixel blocks, there has been the problem that this method cannot provide adaptation to changes of a local nature of images.

To solve this problem, a technique for providing adaptation to each block has been proposed as disclosed in W. H. Chen et al.: "Adaptive Coding of Monochrome and Color Images," IEEE Transactions on Communications, Vol. COM-25, No. 11, pp. 1285–1292 (November 1977). In this technique, the image blocks are classified beforehand into four classes in accordance with the magnitude of an AC power in the block, and the standard for selecting a coefficient (bit assignment) is determined on the basis of the dispersion of the coefficients obtained for each class.

According to this method, since the classification is effected on the basis of only the relative magnitude of the AC power within the block, even if the AC power in the blocks is equal to each other, there occur differences in the distribution of coefficients owing to the directivity of edges and the like. With this method, however, since the coefficients at the same positions are simply selected in the same class irrespective of the differences in the distribution of the coefficients, it is impossible to select the most suitable coefficients for representing an input image, so that it has been impossible to obtain an image with sufficiently high quality.

In view of the above-described problems, a technique of classifying blocks using a vector quantizing technique has been proposed in Katoh, Takegawa, and Ohkubo: "Adaptive Orthogonal Transform Coding Method Using Classification," Transactions of the Institute of Electronics, Information and Communication Engineers (B), Vol. J71-B, No. 1, pp. 1–9, January 1988. It is reported therein that according to this method the image quality and performance are improved over the method disclosed in the above-described literature of W. H. Chen et al. by effecting a classification which takes into consideration the magnitude and the bias of the AC power in the blocks.

In the above-described adaptive orthogonal transform coding method using a classification, in order to reduce a huge amount of calculation entailed in the vector quantization, the coefficients used as vectors are restricted to low-frequency regions where the electric power is concentrated. For this reason, it is not considered that the coefficients are distributed up to a high-frequency region as in the case of pixel blocks including sharp edges. In addition, even if an attempt is made to effect a vector quantization including the coefficients in the high region by expanding the number of dimensions of the vectors, the high-frequency region coefficients rarely conform to a specific distribution. Hence, it is impossible to expect an effect of the classification.

SUMMARY OF THE INVENTION

The present invention has been devised to overcome the above-described problems and it is an object of the present invention to improve the quality of a reproduced image with respect to not only a general image in which electric power is concentrated in low-region coefficients but also an image where the electric power is concentrated in a high-frequency region.

To attain the aforementioned object of the present invention, an apparatus for encoding an image signal in which the image signal is formed into blocks to be subjected to an orthogonal transform, and a transformed coefficient is coded, comprises means for dividing the image signal into pixel blocks, means for performing a two-dimensional orthogonal transform with respect to each of the pixel blocks, means for determining a ratio of electric power to be preserved during coding, in correspondence with the characteristic of each of the pixel blocks, determining means for determining the significance of each of the transformed coefficients in a decreasing order of electric power, the determination being continued until the sum total of electric power of AC coefficients determined to be significant exceeds the ratio of electric power with respect to the sum total of total ac power within the block, and encoding means for encoding as 0 a coefficient which has not been determined to be significant, on the basis of the determination.

Further, the apparatus may be modified as follows. An apparatus for encoding an image signal in which the image signal is formed into blocks and is subjected to an orthogonal transform, and a transformed coefficient is coded, comprises means for dividing the image signal into pixel blocks, means for performing a two-dimensional orthogonal transform with respect to each of the pixel blocks, waveform analyzing means for comparing the waveform in each of the pixel blocks with a plurality of typical patterns to output identification information for identifying a most similar typical pattern, storage means for storing a plurality of items of mask information representing the significance or insignificance of each of the transformed coefficients obtained by the two-dimensional orthogonal transform performing means, mask selecting means for selecting the mask information from the storage means on the basis of the identification information from the waveform analyzing means, coefficient selecting means for determining the significance or insignificance of the transformed coefficient by using the mask information selected to set to 0 the transformed coefficient determined to be insignificant, and encoding means for encoding the post-selection transformed coefficient.

In the present invention, when an image signal is encoded, electric power to be preserved during encoding is determined in correspondence with the characteristics of the image. The coefficients after conversion are consecutively selected starting with the one having the largest rate of power concentration until the power for preservation is secured. Since encoding is effected with respect to only the transformed coefficients thus selected, the coefficients at optimum positions corresponding to the contents of the image are encoded.

Further, when an image signal is encoded, the waveform within a pixel block is compared with a plurality of typical patterns, and identification information for identifying a most similar typical pattern is outputted. A plurality of items of mask information for substituting 0 for each of transformed coefficients are prepared in advance in correspondence with each typical pattern. As the transformed coefficients are provided with masking on the basis of the identification information, the coefficients at optimum positions corresponding to the contents of the image are encoded.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings:

FIG. 3 is a flowchart illustrating the procedure of preparing mask information in accordance with the present invention;

FIG. 4 is an explanatory diagram illustrating the result of sorting coefficient information;

FIGS. 5(A)–5(F) are explanatory diagrams illustrating examples of distributions of coefficient power and mask information determined on the basis of a distribution of coefficient power;

FIGS. 11(A)–11(F) are explanatory diagrams illustrating examples of distributions of pixel values in blocks and distributions of DCT coefficients;

FIG. 12 is an explanatory diagram illustrating the relationship between a pixel block and activity;

FIG. 13 is an explanatory diagram of the content of a mask dictionary;

FIG. 14 is a flowchart illustrating the procedure of preparing mask information in accordance with the present invention;

FIG. 15 is an explanatory diagram illustrating the result of sorting coefficient dispersions; and FIGS. 16(A)–16(F) are explanatory diagrams illustrating examples of mask information determined on the basis of a distribution characteristic of coefficients.

DESCRIPTION OF THE PREFERRED EMBODIMENTS

Figure 1:
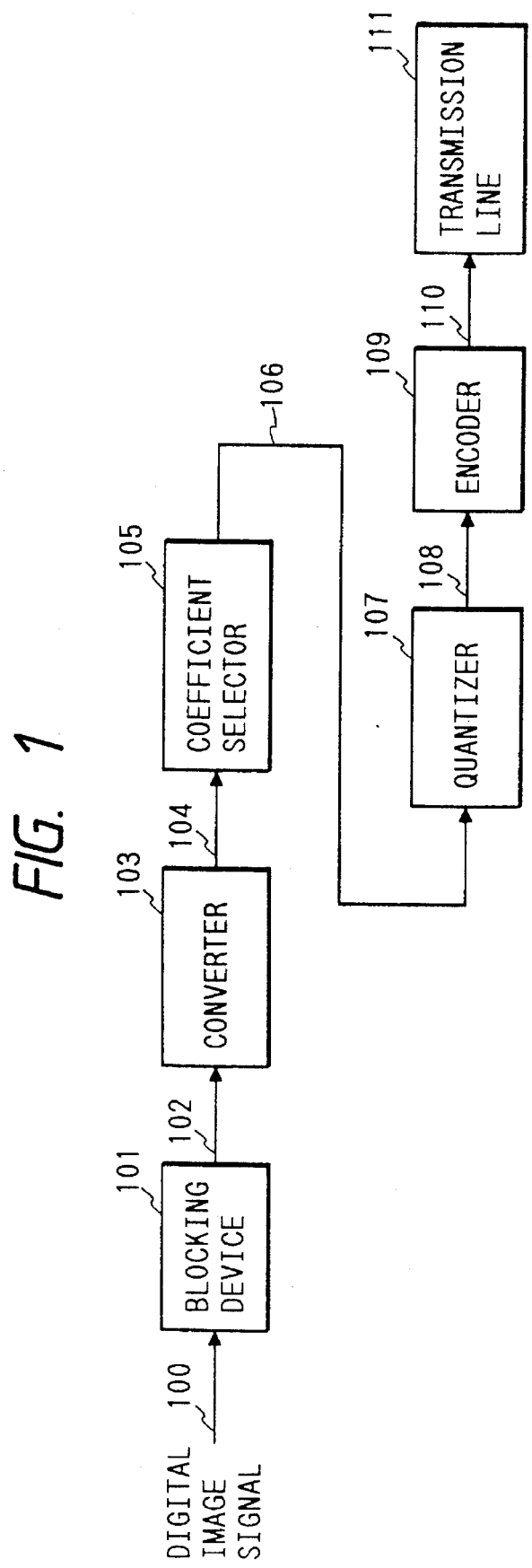
FIG. 1 is a block diagram of a conventional encoding apparatus.
Figure 2:
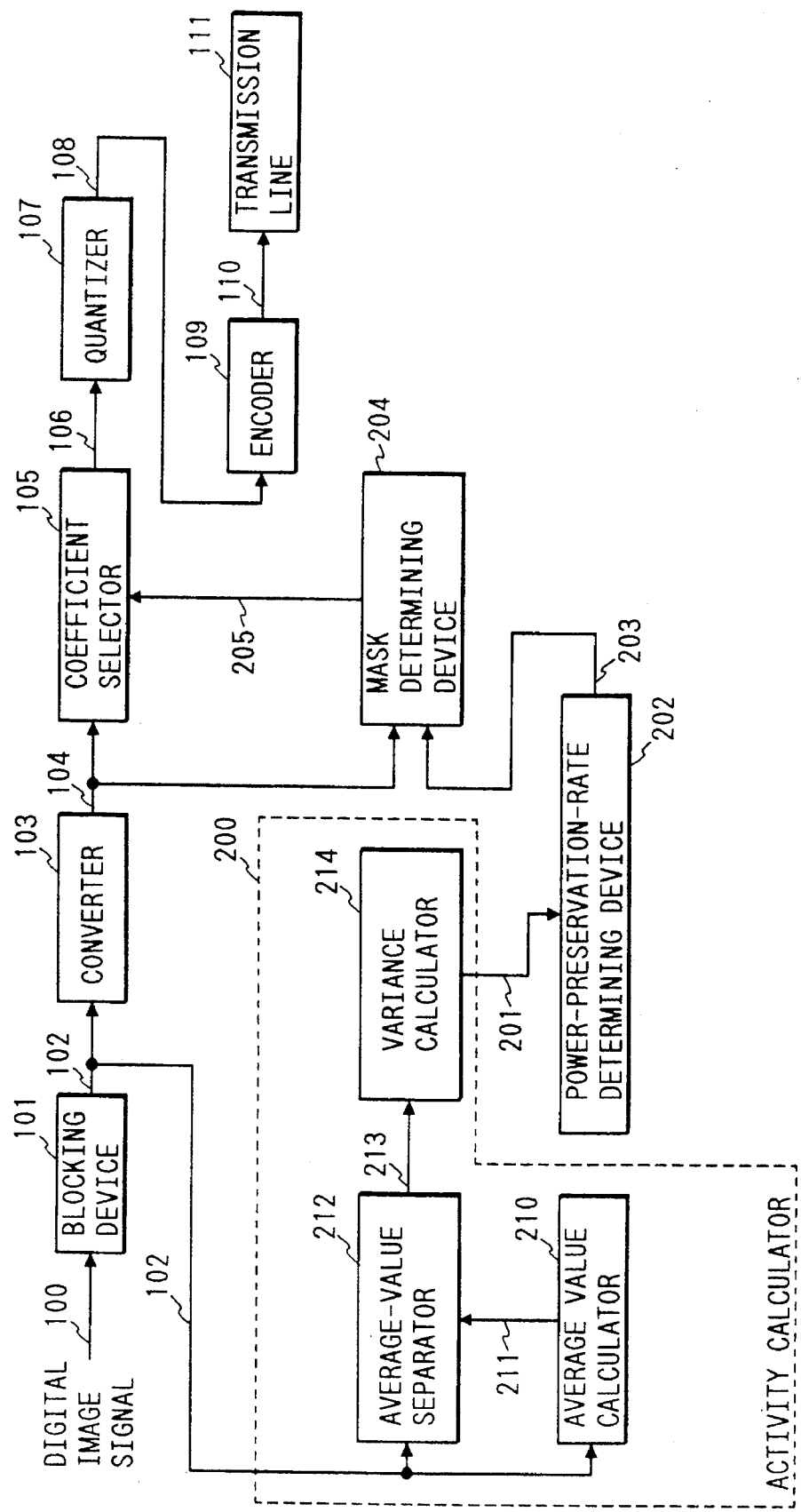
FIG. 2 is a block diagram illustrating a first embodiment of an encoding apparatus in accordance with the present invention.

FIG. 2 is a block diagram illustrating a first embodiment of an encoding apparatus in accordance with the present invention. It should be noted that portions corresponding to those of the conventional apparatus shown in FIG. 1 are denoted by the same reference numerals.

Reference numeral 101 denotes a blocking device; 103, a converter; 105, a coefficient selector; 107, a quantizer; 109, an encoder; and 111, a transmission line. In addition, numeral 200 denotes an activity calculator for calculating the resolution, i.e., activity 201, within a pixel block 102; 202, a power-preservation-rate determining device for determining a power preservation rate 203 of the ac power of the pixel block 102 on the basis of the activity 201; and 204, a mask determining device for outputting mask information 205 which serves as a standard for determining the selection of coefficients in the coefficient selector 105 by using transformed coefficients 104 and the power preservation rate 203.

In this embodiment, adaptive processing is effected in addition to three kinds of processing, i.e., the transformation, information reduction, and code assignment, which are conventionally carried out as shown in FIG. 1. This adaptive processing is operated in parallel with transformation processing and realizes adaptive information reduction adapted to the feature of each pixel block in the information reduction processing that follows.

Since the three kinds of processing, i.e., transformation, information reduction, and code assignment, are similar to those of the prior art shown in FIG. 1, a description thereof will be omitted, and a description will be given of only the adaptive processing.

The adaptive processing consists of the calculation of the activity and the analysis of the waveform.

The activity is an index which indicates the resolution of an image, and the variance within a pixel block will be used. An activity can be obtained from the following expression:

$$\sigma = \Sigma |x_i - m|/N \quad (5)$$

where $x_i$ is a pixel value within a block, m is an average value of pixel values within the block, and N is the total number of pixels within the block.

This activity $\sigma$ is determined by the activity calculator 200 shown by a portion surrounded by a broken-line frame in FIG. 2. In the activity calculator 200, reference numeral 210 denotes an average value calculator for calculating an in-block average value 211 on the basis of each pixel value of the pixel block 102; 212, an average-value separator for calculating the difference between each pixel value of the pixel block 102 and the in-block average value 211 and outputting an average-value separated signal 213; and 214, a variance calculator for calculating the activity 201 on the basis of the average-value separated signal 213.

In the variance calculator 214, the sum of the absolute values of the average-value separated signals 213 outputted from the average value separator 212 is divided by the total number of pixels in the block in accordance with the expression (5), and the activity 201 is outputted.

In the power-preservation-rate determining device 202, the power preservation rate 203 is determined on the basis of the activity 201 calculated by the activity calculator 200. The power preservation rate 203 is a ratio of the coefficient power preserved after the selection of coefficients in the coefficient selector 105 to the total coefficient power.

The power preservation rate 203 is set at a high level with respect to a block showing a large activity, i.e., a block with a high resolution, while the power preservation rate 203 is set at a low level with respect to a block showing a small activity.

For instance, in the case where the pixel block 102 assumes identical values for all the pixels, the activity 201 becomes zero in the activity calculator 200. At this time, in the transformed coefficient 104 as well, which is an output of the converter 103, all the signal values of the AC component become zero. Accordingly, the power preservation rate in the case where the activity 201 is zero can be set to be zero (%).

As one technique for realizing the power-preservation-rate determining device 202, the power preservation rate 203 can be determined through a comparison with a threshold value of the activity 201.

For instance, assuming that the activity is $\sigma$, the relationship between threshold values $T_0, T_1, \ldots, T_{N-1}$ and power preservation rates $R_0, R_1, \ldots, R_N$ may be determined as hereinbelow. In this case, N is a threshold value which is set.

When $\sigma < T_0$, the power preservation rate is $R_0$.
When $T_0 \leq \sigma < T_1$, the power preservation rate is $R_1$.

When $T_{N-1} \leq \sigma$, the power preservation rate is $R_N$.

The procedure for preparing mask information will be described with reference to the flowchart shown in FIG. 3.

The transformed coefficients 104 inputted to the mask determining device 204 are sorted in a decreasing order of the coefficient electric power, and pairs of the respective power values and coefficient positions are stored in the form of a table as shown in FIG. 4 (Step 101). In case of an eighth order two-dimensional orthogonal transform, the positional coefficients fall within the range of (0, 0) to (7, 7), but since (0, 0) is a DC component, it is excluded and 63 storage areas equivalent in the number to the total number of the ac coefficients are prepared. The contents of the storage areas can be referred to by a pointer.

Prior to the starting of processing, the pointer is set to a leading end in the table, i.e., a coefficient having maximum power in the transformed coefficients 104. In addition, "0" is set to all the elements of the mask information 205 (Step 102).

In a loop in the flowchart shown in FIG. 3, the in operation of setting "1" to the mask information 205 in correspondence with the coefficient position is performed in order beginning with the coefficient having the largest electric power (Step 105). Concurrently, a cumulative total of values of the coefficient electric power is calculated (Step 103), and processing is stopped at a point of time when the ratio of the cumulative values of power to the total AC power has exceeded the power preservation rate 203 (Step 104).

Figures 5A, 5B, 5C, 5D, 5E, 5F:
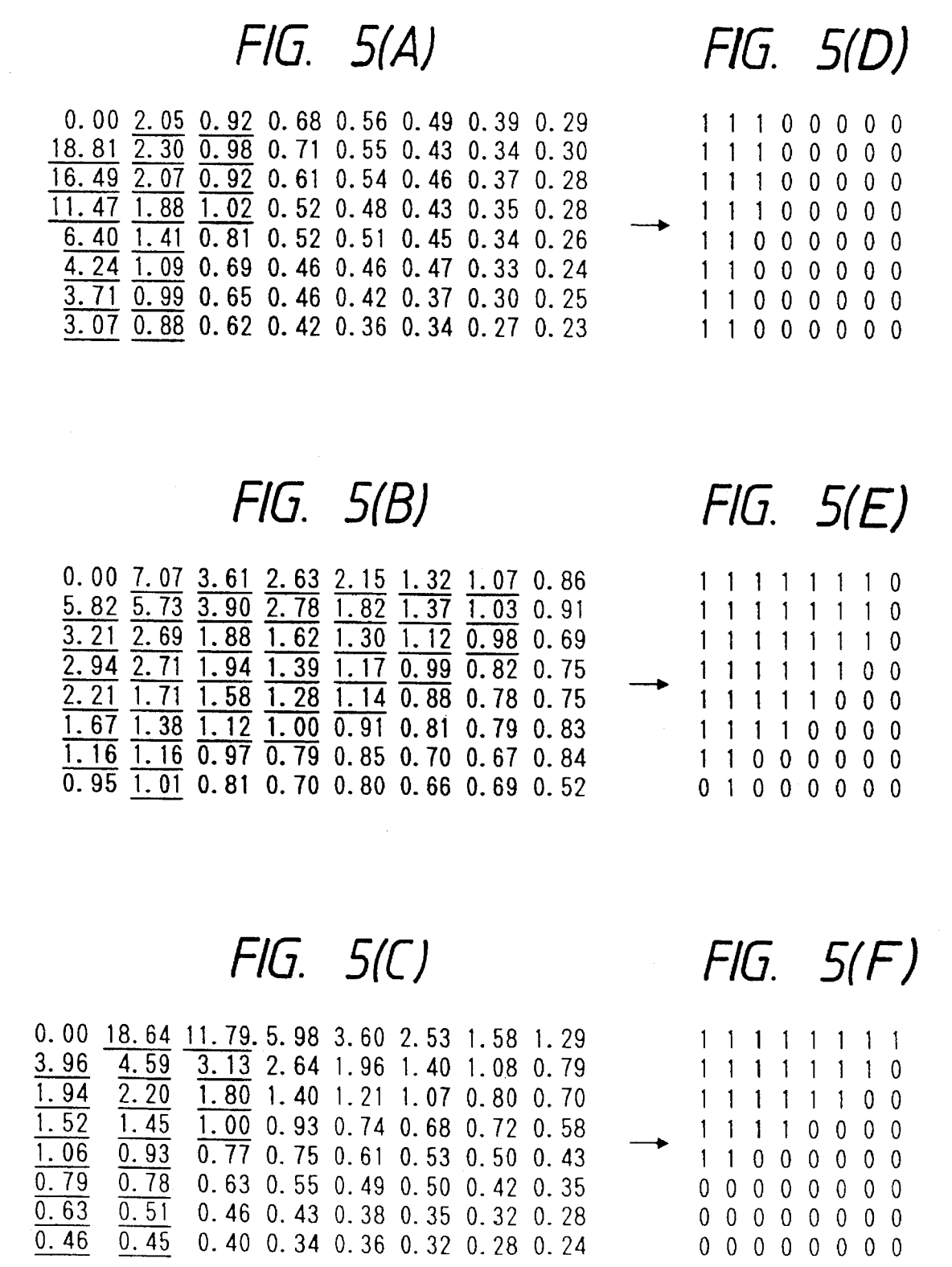

FIGS. 5(A) to 5(F) show examples of the ratios of the respective coefficient power when the total AC power is set to 100, as well as examples of the mask information prepared by setting an 80% power preservation rate as a terminating condition. FIGS. 5(A), 5(B), and 5(C) respectively show electric power concentration rates of the respective coefficients corresponding to different image blocks, and the underlined portions are coefficient positions which satisfy the 80% power preservation rate. In addition, FIGS. 5(D), 5(E), and 5(E) show mask information corresponding to FIGS. 5(A), 5(B), and 5(C), respectively, and the mask information at each underlined position is set to "1," However, the mask information at the (0, 0) position indicating a DC component is always set to "1."

Next, a detailed description will be given of the information reduction processing.

In the mask determining device 204 shown in FIG. 2, the mask information 205 is prepared on the basis of the transformed coefficients 104 and the power preservation rate 203, and is outputted to the coefficient selector 105.

Figure 6:
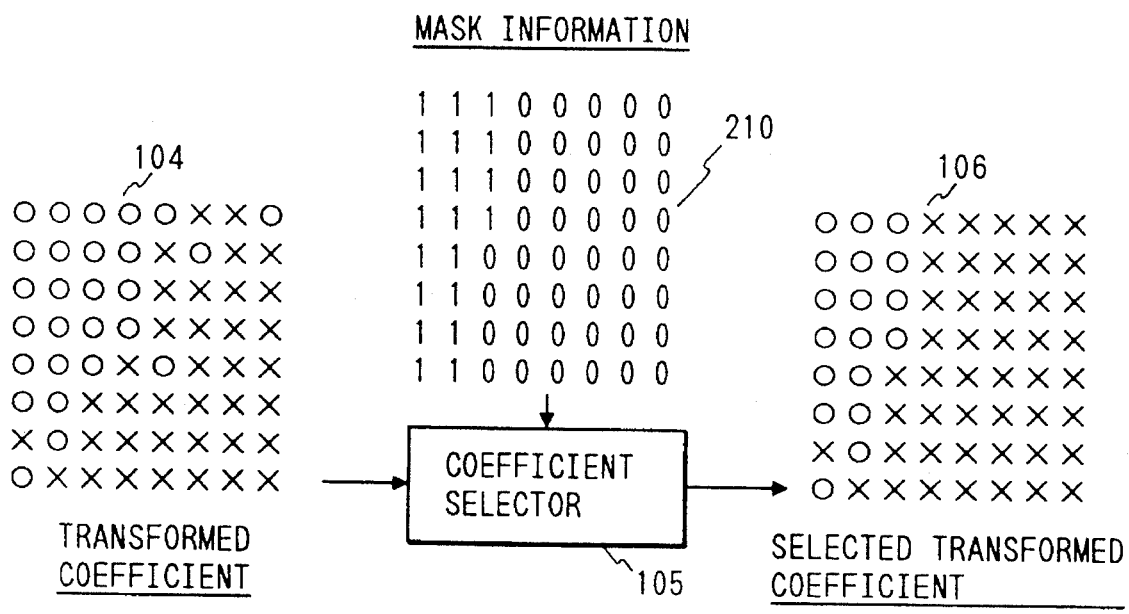
FIG. 6 is an explanatory diagram illustrating the operation of selecting coefficients in the present invention.

Referring to FIG. 6, a description will be given of an outline of the operation of selection of coefficients in the coefficient selector 105.

The mask information 205 is a matrix having the same size as the transformed coefficient 104, and each element includes binary information of "1" or "0." It should be noted that the mask information 205 shown in FIG. 6 corresponds to the mask information shown in FIG. 5(D). The information "1" and "0" constituting each element serves as information indicating the selection of the coefficients in the coefficient selector 105. The coefficients which have not been selected are forcibly set to zeros. The result of selection is outputted as the selected transformed coefficient 106. It should be noted that in the transformed coefficients 104 shown in FIG. 6, those marked "o" show non-zero coefficients, while those marked "x" show zero coefficients.

The information reduction processing by the quantizer 107 and the code assignment processing by the encoder 109 are similar to those of the conventional apparatus.

Figure 7:
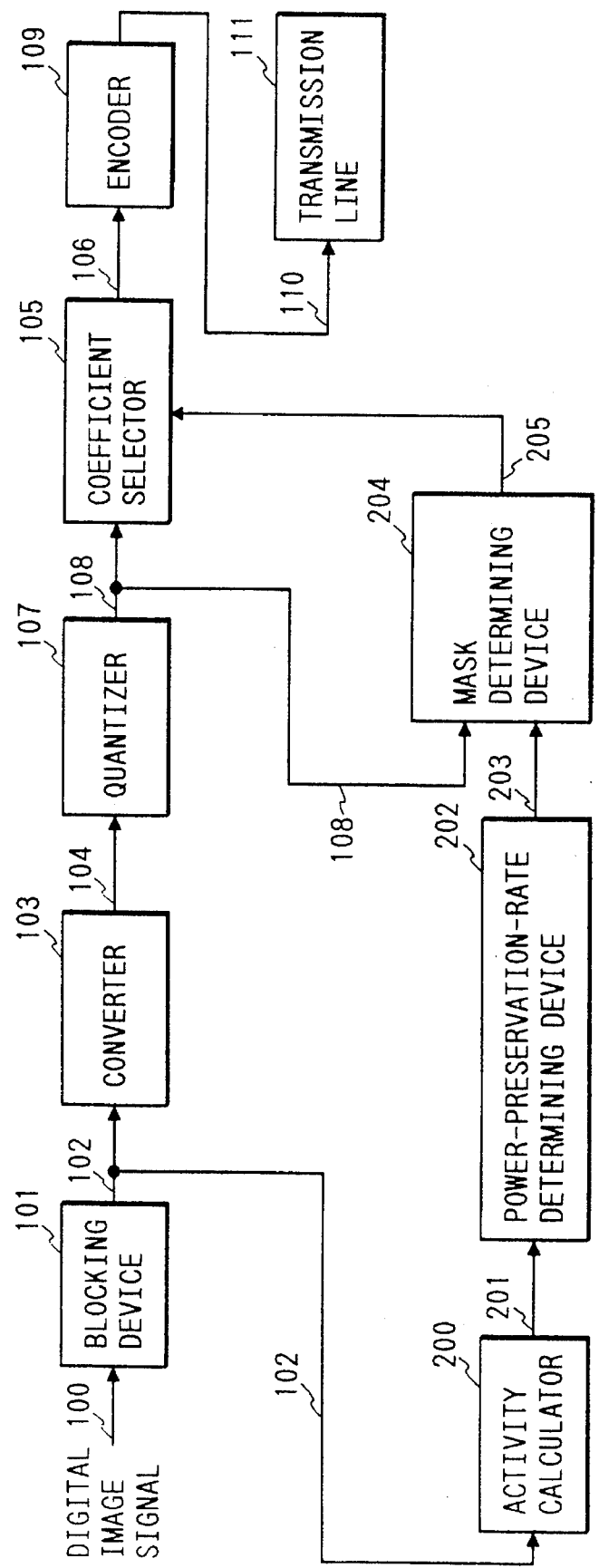
FIG. 7 is a block diagram illustrating a second embodiment of the encoding apparatus of the present invention.

Referring next to FIG. 7, a description will be given of a second embodiment of the present invention. The embodiment shown in FIG. 7 is arranged such that the positions of the coefficient selector 105 and the quantizer 107 are alternated in the block diagram of the embodiment shown in FIG. 2.

In the same way as in the first embodiment shown in FIG. 2, the second embodiment shown in FIG. 7 comprises four processes of processing including transformation, information reduction, code assignment, and adaptation, but since the operation of adaptive processing differs therefrom, a description will be given of only the operation of the adaptive processing.

The transformed coefficients 104 obtained from the converter 103 are quantized with a uniform step width with respect to all the AC coefficients in the quantizer 107, and quantization coefficients 108 are obtained. The quantization coefficients 108 are applied to the coefficient selector 105, and are also applied to the mask determining device 204. In the mask determining device 204, by using the quantization coefficients 108 whose accuracy is lower than that of the transformed coefficients 104, the amount of calculation at the time of sorting the transformed coefficients starting with the one having the largest coefficient power is reduced. At the same time, the storage area for storing the sorted results can also be reduced.

It should be noted that in the above-described embodiments, while the activity, i.e., the variance is obtained before transformation of the image blocks, modification is possible by providing means for calculating the in-block dispersion of the transformed coefficients after an orthogonal transform to determine the power preservation rate on the basis of the calculated result thereof. However, if the overall processing time is taken into consideration, since transformation processing and the processing for determining the variance can be subjected to parallel processing, it is desirable to calculate the variance prior to the transformation of the image blocks.

Figure 8:
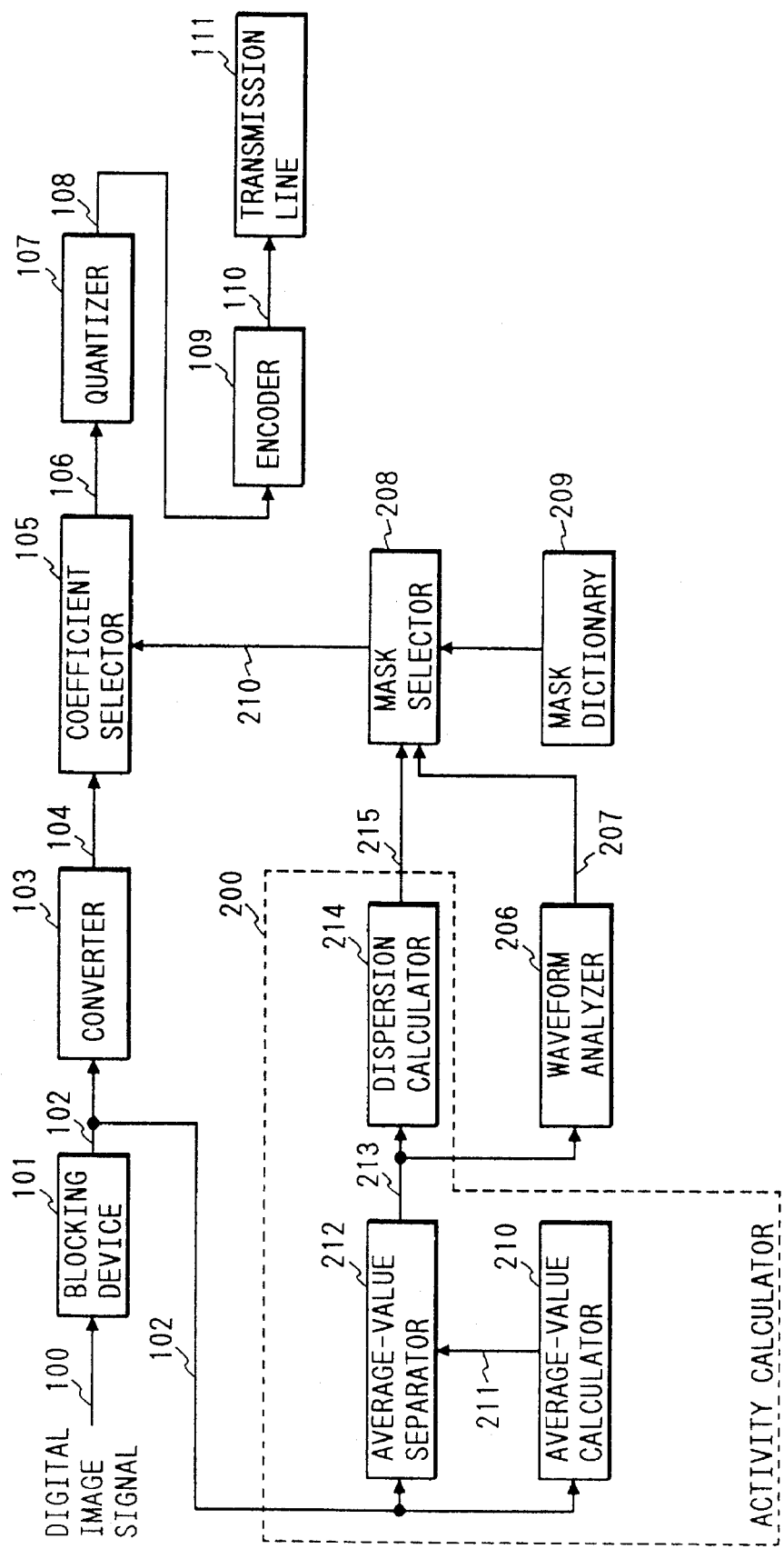
FIG. 8 is a block diagram illustrating a third embodiment of an encoding apparatus in accordance with the present invention.

FIG. 8 is a block diagram illustrating a third embodiment of an encoding apparatus in accordance with the present invention. It should be noted that portions corresponding to those shown in FIGS. 1 and 2 are denoted by the same reference numerals.

Reference numeral 101 denotes a blocking device; 103, a converter; 105, a coefficient selector; 107, a quantizer; 109, an encoder; and 111, a transmission line. In addition, numeral 210 denotes an average value calculator for calculating an average value 211 from a pixel block 102; 212, an average-value separator for subtracting the average value 211 from each pixel value of the pixel block 102 and outputting an average-value separated signal 213; 214, a variance calculator for calculating a variance in a block on the basis of the average-value separated signal 213 and outputting the same as an activity 215; 206, a waveform analyzer for analyzing a signal waveform in a block on the basis of the average-value separated signal 213 and outputting the same as waveform information 207; and 208, a mask selector for selecting mask information 210 from a mask dictionary 209 on the basis of the activity 210 and the waveform information 207. The selected mask information 210 is inputted to the coefficient selector 105. It should be noted that the average value calculator 210, the average value separator 212, and the variance calculator 214 constitute an activity calculator 200.

In this embodiment, adaptive processing is effected in addition to three kinds of processing, i.e., the transformation, information reduction, and code assignment, which are conventionally carried out, as shown in FIG. 1. This adaptive processing is operated in parallel with transformation processing and realizes adaptive information reduction adapted to the feature of each pixel block in the information reduction processing that follows.

Since the three kinds of processing, i.e., transformation, information reduction, and code assignment, are similar to those shown in FIGS. 1 and 2, a description will be given of only the adaptive processing.

The adaptive processing includes the calculation of the activity and the analysis of the waveform.

The activity is an index which indicates the resolution of an image, and the variance within a pixel block will be used. An activity can be obtained from the above described expression (5).

Referring to FIG. 8, the calculation of the activity will be described. The average value 211 of the pixel block 102, which corresponds to m in the expression (5), is calculated in the average value calculator 210. In the average value separator 212, the average-value separated signal 213 is generated by subtracting the value of the average value 211 from each pixel value of the pixel block 102. In the variance calculator 214, the sum of absolute values of the average-value separated signals 213 in accordance with the expression (5), and the sum of absolute values is then divided by the total number of pixels in the block to calculate and output the activity 215.

Figure 9:
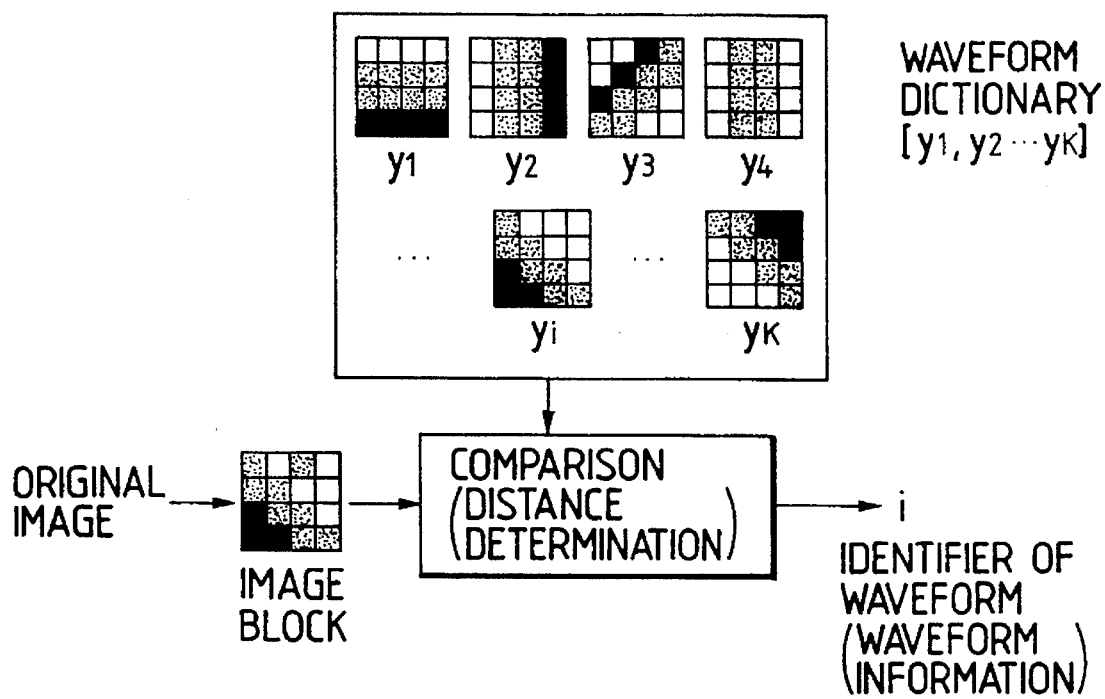
FIG. 9 is an explanatory diagram of waveform analysis.

Referring next to FIG. 9, a description will be given of the waveform analysis. Pattern matching is employed as a technique of determining the similarity of the waveforms. In this technique, each of a plurality of basic waveforms y1, y2, ..., yi, ..., yk which are prepared in a waveform dictionary as well as an image block inputted are regarded as vectors, and a waveform of a shortest distance is selected through the determination of the two vectors, so that an identifier i of the waveform selected is outputted.

As a technique of such a waveform analysis of an image signal, a method has been proposed in the co-pending U.S. patent application Ser. No. 07/903,284, now U.S. Pat. No. 5,500,907, filed Jun. 24, 1992 which is to be assigned to the same assignee. It should be noted that the reason for performing the waveform analysis in this manner is that, to adaptively code the image signal, it is effective to analyze the waveform of the image signal before coding, and to control the coding parameters by using the results of that analysis.

Figure 10:
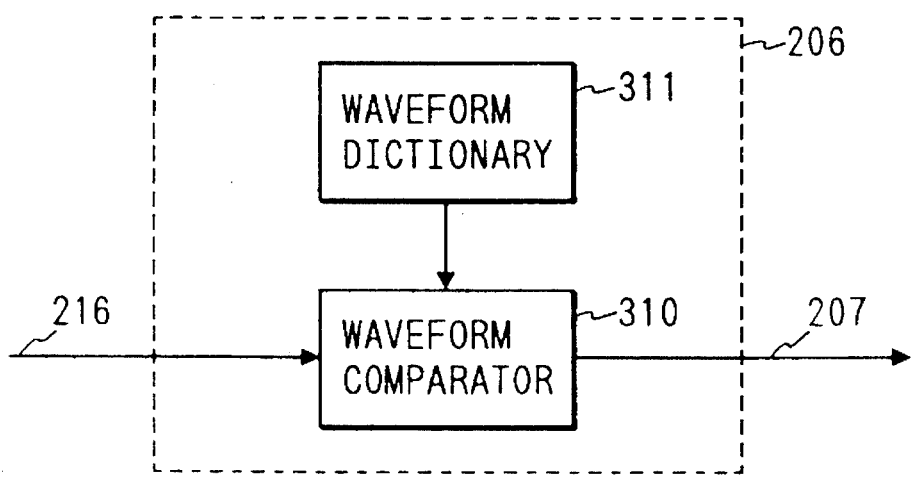
FIG. 10 is a block diagram of a waveform analyzer.

The waveform analyzer 206 will be described in detail with reference to FIG. 10. In FIG. 10, reference numeral 216 denotes the average-value separated signal; 310, a waveform comparator; and 311, a waveform dictionary in which a plurality of waveforms are registered. In addition, numeral 207 denotes waveform information for identifying the registered waveforms.

The operation of the waveform analyzer 206 will be described hereinafter. In the waveform comparator 310, a determination of the distance is made between the average-value separated signal 216 inputted and the plurality of waveforms registered in the waveform dictionary 311. The plurality of waveforms registered in the waveform dictionary 311 are respectively provided with identifiers for identifying them. As a result of the determination of the distance, the information for identifying the basic waveform which is determined to be the closest is outputted as the waveform information 207.

Figures 11A, 11B, 11C, 11D, 11E, 11F:
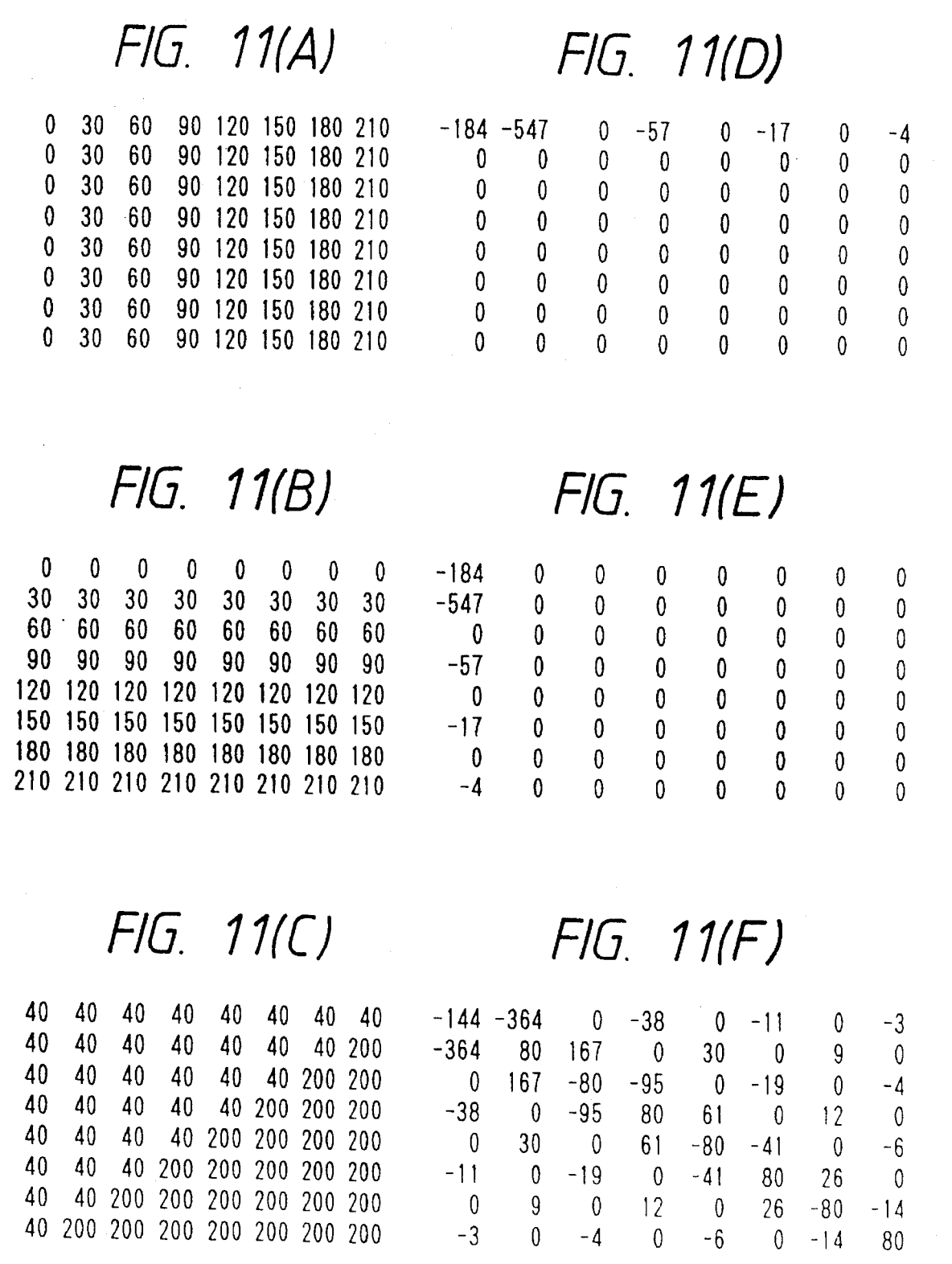

FIGS. 11(A), 11(B), and 11(C) show distributions of pixel values in 8×8 pixel blocks, respectively, in which the distributions of pixel values in the blocks are the cases of a horizontal gradation, a vertical gradation, and a slanting edge. Meanwhile, FIGS. 11(D), 11(E), and 11(F) respectively show coefficient matrices in cases where the DCT is performed with respect to each of the pixel blocks. As can be seen from the drawings, specific coefficient distributions correspond to the distributions of pixel values in the inputted image blocks. This fact indicates that the form of distribution of the coefficients can be estimated from the signal waveform of the inputted pixel block.

For instance, assuming that the waveform of the pixel block has a horizontal gradation as shown in FIG. 11(A), the coefficients in the first row in the coefficient matrix are sufficient as the coefficients to be coded after the transformation, as shown in FIG. 11(D). In addition, in the case of the waveform having a vertical gradation as shown in FIG. 11(B), the coefficients in the first column in the coefficient matrix are sufficient as the coefficients to be coded after the transformation, as shown in FIG. 11(E). On the other hand, in the case of the waveform having a slanting edge as shown in FIG. 11(C), the coefficients in an extensive range in the vicinity of a diagonal line of the coefficient matrix need to be subjected to coding, as shown in FIG. 11(E).

Thus, if the selection of the coefficients is controlled in correspondence with the estimated form of distribution of the coefficients, it is possible to overcome the deterioration of the image quality in the vicinity of the edge which has been the problem in the conventional transform coding method. In other words, since the state of the distribution of the coefficients can be estimated from the result of the waveform analysis, the coefficients can be selected efficiently on the basis of the estimated results.

Similarly, the activity which indicates the resolution within the pixel block can be used as an index for determining the range of selection of the coefficients.

As shown in FIGS. 12(A) and 12(B), a block showing a small activity (see FIG. 12(B)) is a block with a flat pattern and assumes a gradual distribution of pixels. Meanwhile, a block showing a large activity (see FIG. 12(A)) is a block with an intricate pattern and is a fine pixel distribution including an edge and the like. In the pixel block showing a small activity, the correlation between the pixels is high and the electric power is concentrated at the coefficients in a lower region after the transformation, so that it suffices if they are selected. In addition, in the pixel block showing a large activity, the coefficient electric power is dispersed widely within the coefficient matrix due to the effect of the edge and the like, it is necessary to widely set the range of selection of the coding coefficients.

A method of selecting the coding coefficients by means of masks will be described hereafter.

FIG. 13 is a diagram illustrating the contents of the mask dictionary 209 in FIG. 8. The mask information registered in the mask dictionary is selected on the basis of the waveform information and activity for each block which were determined earlier. An index is determined from the activity through appropriate threshold value processing. For instance, if the activity is assumed to be $\sigma$, the relationship between threshold values $T_0, T_1, \ldots, T_{N-1}$ and indices $R_0, R_1, \ldots, R_N$ can be determined as shown below. N is a threshold value which is set, with the result that the activity is classified as a class (N +1). It should be noted that the threshold values may be set for each item of waveform information.

When $\sigma < T_0$, the index is $R_0$.

When $T_0 \leq \sigma < T_1$, the index is $R_1$.

When $T_{N-1} \leq \sigma$, the index is $R_N$.

The mask information 210 registered in the mask dictionary 209 needs to be determined prior to the coding operation, and the number of items thereof is equal to the number of states of the pixel blocks classified by the waveform analysis and the number of classes of the activity.

Each item of the mask information is determined in correspondence with a peculiar distribution of coefficients for each state of the pixel block mentioned above. The procedure thereof will be described hereafter.

First, the state of the pixel block detected from the image is determined on the basis of the waveform analysis and the threshold value processing of the activity, and the transformed coefficients for each pixel block is classified for each state.

Subsequently, a typical distribution characteristic of coefficients is determined for each aggregate of the transformed coefficients classified. As the distribution characteristic, it is possible to use a coefficient variance matrix obtained by cumulatively totalizing the absolute values of the coefficients for each position within the transformed coefficient matrix.

Referring now to the flowchart shown in FIG. 14, a description will be given of the procedure for determining mask information on the basis of the coefficient variance matrix.

The coefficient variance matrices of the respective aggregates are sorted in a decreasing order of the variance values, and pairs of the respective variance values and coefficient positions are stored in the form of a table as shown in FIG. 15 (Step 301). In the case of an eighth order two-dimensional orthogonal transform, the positional coefficients fall within the range of (0, 0) to (7, 7), but since (0, 0) is a dc component, they are excluded and 63 storage areas equivalent in number to the total number of the ac coefficients are prepared. The contents of the storage areas can be referred to by a pointer.

Prior to the starting of processing, the pointer is set to a leading end in the table, i.e., a maximum variance value in the variance matrix. In addition, "0" is set to all the elements of the mask information (Step 302).

In a loop in the flowchart shown in FIG. 14, the operation of setting "1" to the mask information in correspondence with the coefficient position is performed in order beginning with the coefficient having the largest variance (Steps 305, 306). Concurrently, a cumulative total of the variance values is calculated (Step 303), and processing is stopped at a point of time when the ratio of the cumulative values of variance to the total variances has exceeded a predetermined threshold value (Step 304). In addition, it is assumed that the predetermined threshold value just mentioned can be set separately with respect to the waveform analysis and the activity.

Figures 16A, 16B, 16C, 16D, 16E, 16F:
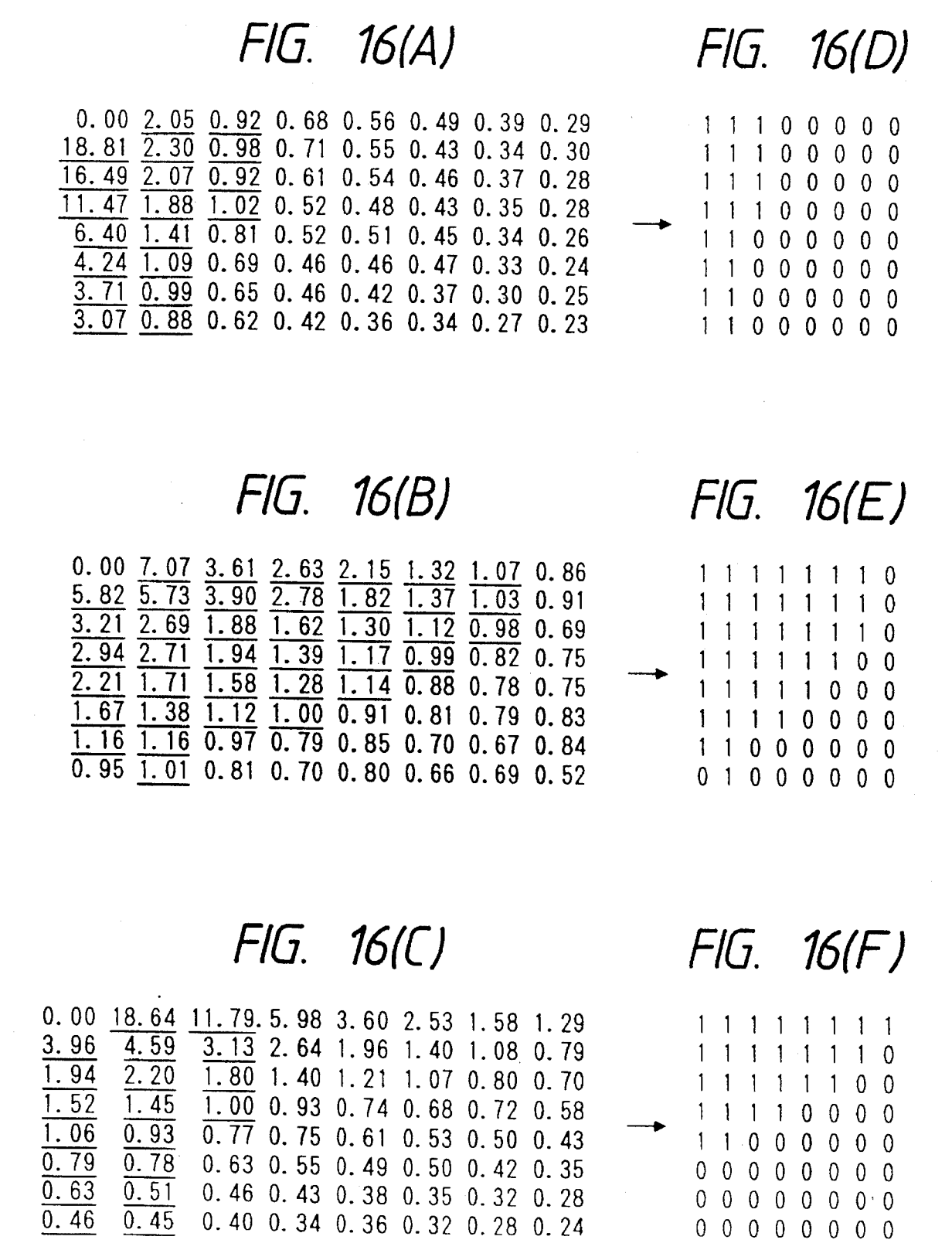

FIGS. 16(A) to 16(F) show examples of distributions of the electric power concentration rates of the DCT coefficients as well as examples of the mask information prepared by setting an 80% power preservation rate as a terminating condition. FIGS. 16(A), 16(B), and 16(C) respectively show electric power concentration rates of the respective coefficients corresponding to different image blocks, and the underlined portions are coefficient positions which satisfy the 80% power preservation rate. In addition, FIGS. 16(D), 16(E), and 16(F) show mask information corresponding to FIGS. 16(A), 16(B), and 16(C), respectively, and the mask information at each underlined position is set to "1," However, the mask information at the (0, 0) position indicating a dc component is always set to "1."

As the mask information thus prepared is registered in the mask dictionary, during coding, it is possible to select a mask for effecting optimum selection of coefficients in correspondence with the results of waveform analysis and the result of calculation of activity.

In the present invention, since the electric power to be preserved is transformed in correspondence with the nature of the image and the transformed coefficients are selected in correspondence with the preserved power, the selection of transformed coefficients can be carried out adaptively with respect to the local nature of an image, it is possible to suppress the deterioration of image quality attributable to the presence of edges and the like.

What is claimed is:

1. An apparatus for encoding an image signal in which the image signal is formed into blocks and is subjected to an orthogonal transform, and a transforming coefficient is coded, comprising:

means for dividing the image signal into pixel blocks;

means for performing a two-dimensional orthogonal transform with respect to each of said pixel blocks;

waveform analyzing means for comparing the wave form in each of the pixel blocks with a plurality of typical patterns to output identification information for identifying a most similar typical pattern;

storage means for storing a plurality of items of mask information representing the significance or insignificance of each of a plurality of transforming coefficients obtained by said means for performing a two-dimensional orthogonal transform;

mask selecting means for selecting the mask information from said storage means on the basis of the identification information from said waveform analyzing means;

coefficient selecting means for determining the significance or insignificance of each of the transforming coefficients by using the mask information selected to set to 0 a transforming coefficient determined to be insignificant and for yielding at least one transforming coefficient selected by the selecting means and not determined to be insignificant; and encoding means for encoding the transforming coefficient selected by the selecting means.

2. The apparatus for encoding an image signal as defined in claim 1 wherein said waveform analyzing means carries out pattern matching to compare the waveform in each of the pixel blocks with the plurality of typical patterns.

3. The apparatus for encoding an image signal as defined in claim 1 further comprising means for calculating activity in the pixel block, wherein said mask selecting means selects mask information from said storage means by using the identification information and the activity from said means for calculating activity.

* * * * *